Aug. 27, 1929.   T. B. SMITH   1,726,370
LIQUID COMPUTING AND DISPENSING APPARATUS
Filed July 15, 1927   3 Sheets-Sheet 1
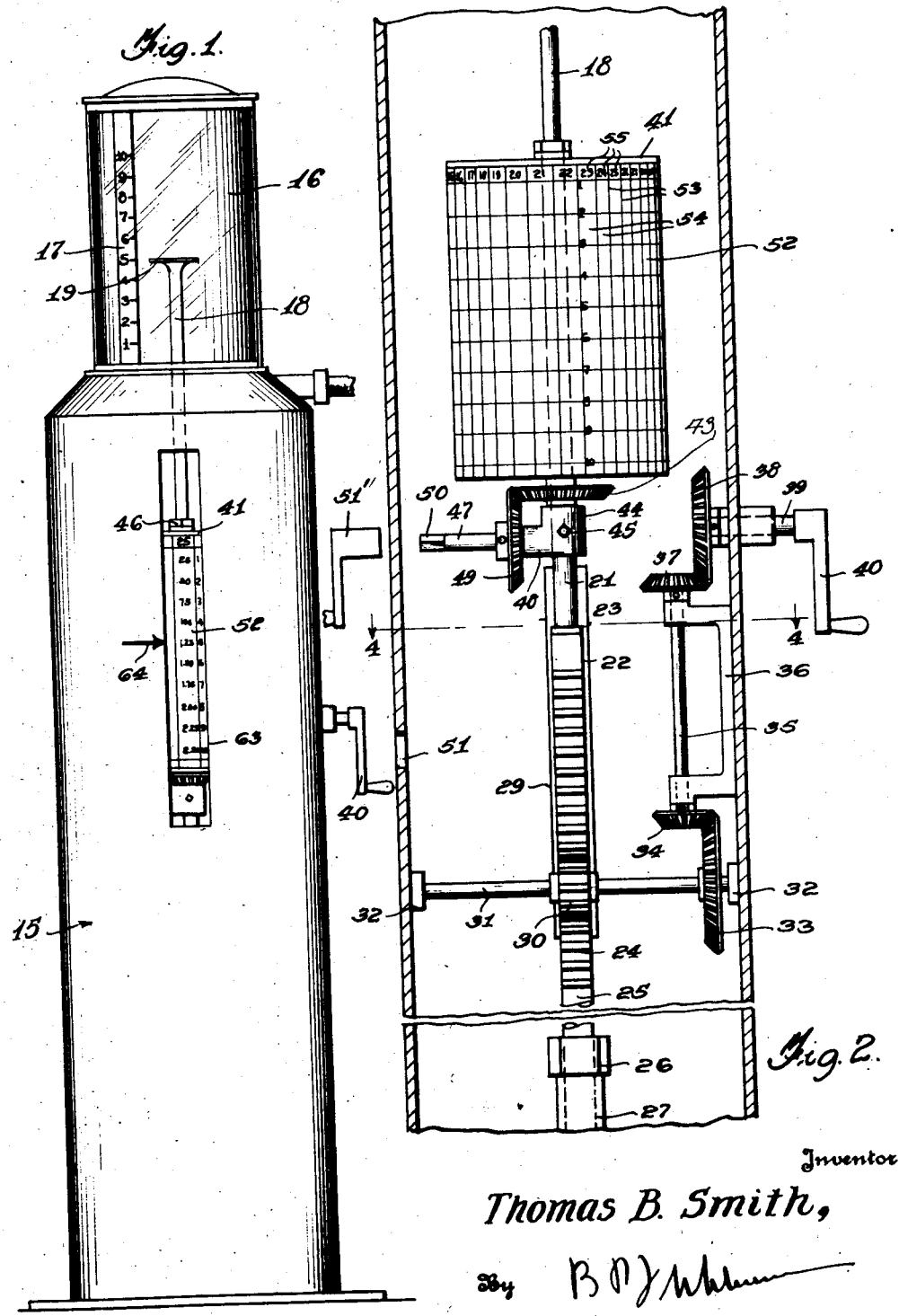
Inventor
Thomas B. Smith,
By
Attorney Aug. 27, 1929.  T. B. SMITH  1,726,370
LIQUID COMPUTING AND DISPENSING APPARATUS
Filed July 15, 1927   3 Sheets-Sheet 2

Inventor
Thomas B. Smith,
By
Attorney

Aug. 27, 1929.    T. B. SMITH    1,726,370
LIQUID COMPUTING AND DISPENSING APPARATUS
Filed July 15, 1927    3 Sheets-Sheet 3
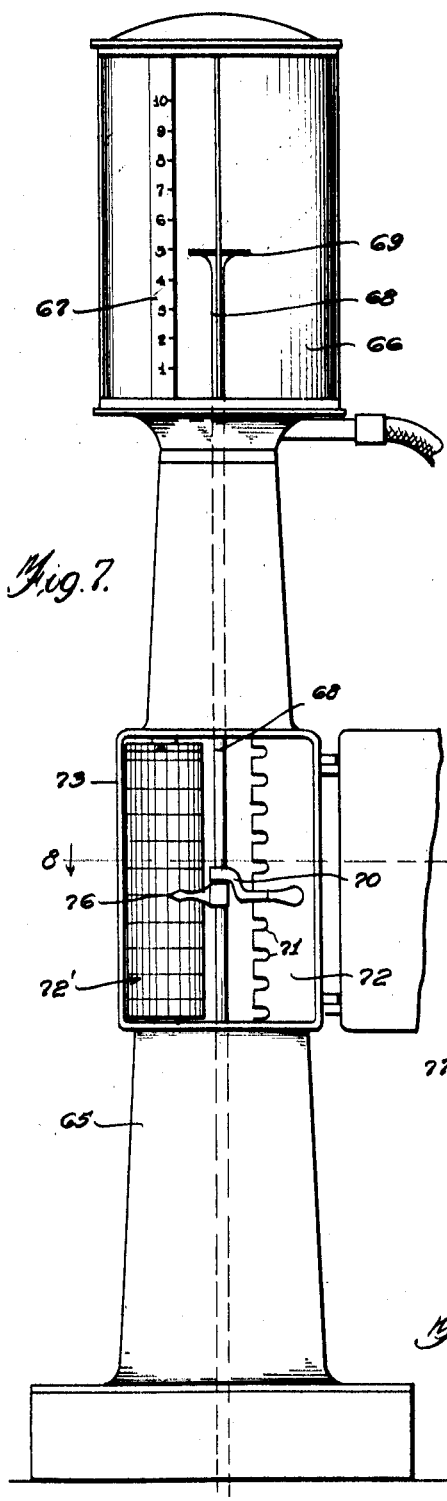
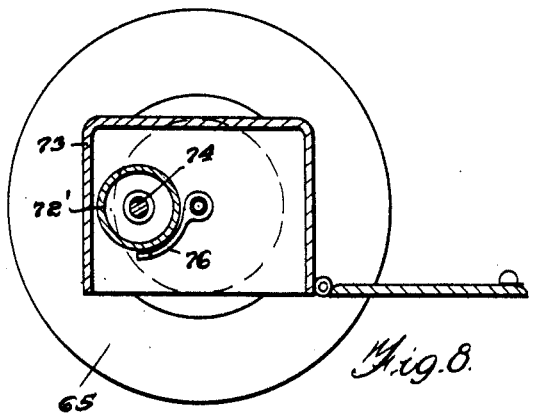
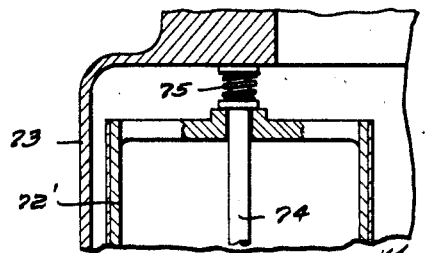
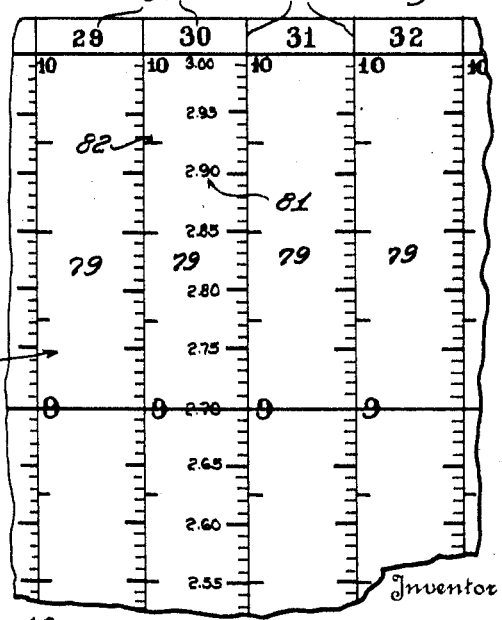
Inventor
Thomas B. Smith,
By
Attorney Patented Aug. 27, 1929.

1,726,370

UNITED STATES PATENT OFFICE.

THOMAS B. SMITH, OF PINEWOOD, SOUTH CAROLINA.

LIQUID COMPUTING AND DISPENSING APPARATUS.

Application filed July 15, 1927. Serial No. 206,103.

My invention relates to liquid dispensing and computing apparatus, designed particularly for handling gasoline, although it may be used for other purposes.

An important object of the invention is to provide apparatus of the above mentioned character, which is accurate and reliable in operation, and yet of relatively simple construction.

A further object of the invention is to provide an apparatus of the above mentioned character, the computing scale of which is visible to the purchaser.

A further object of the invention is to provide apparatus of the above mentioned character, the essential elements of which may be sealed after adjustment.

Other objects and advantages of the invention will be apparent during the course of the following description.

Figure 3:
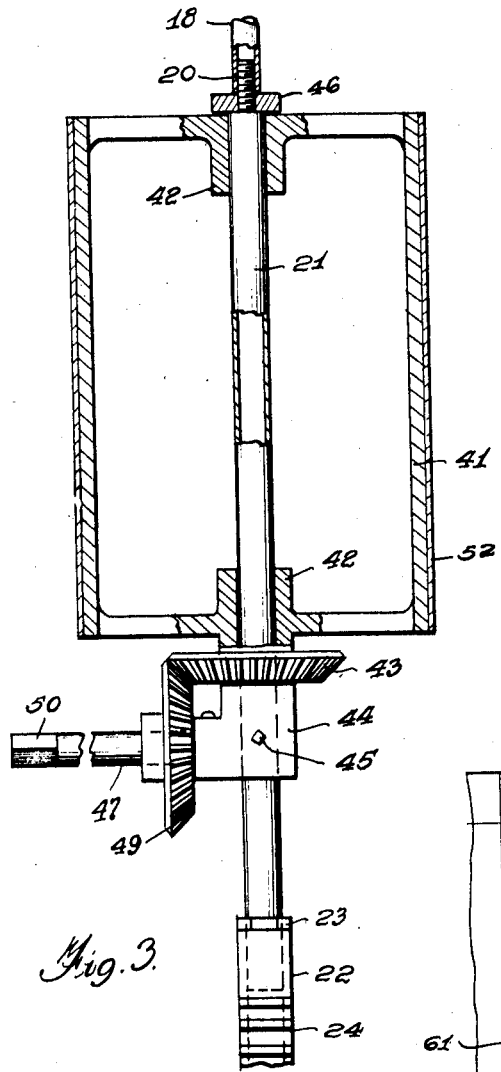
Figure 4:
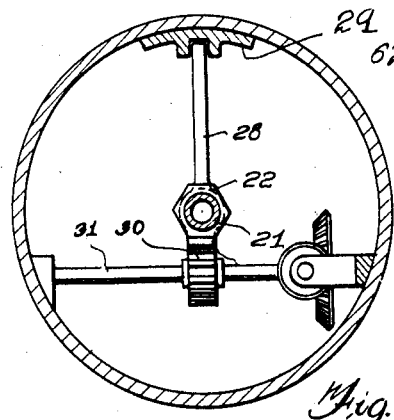
Figure 5:
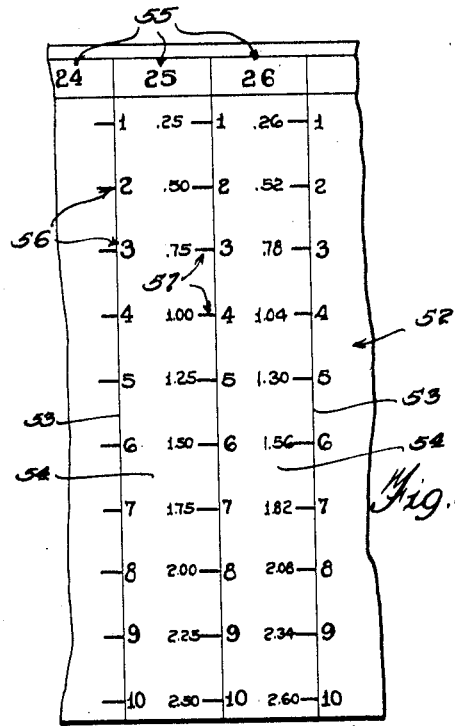
Figure 6:
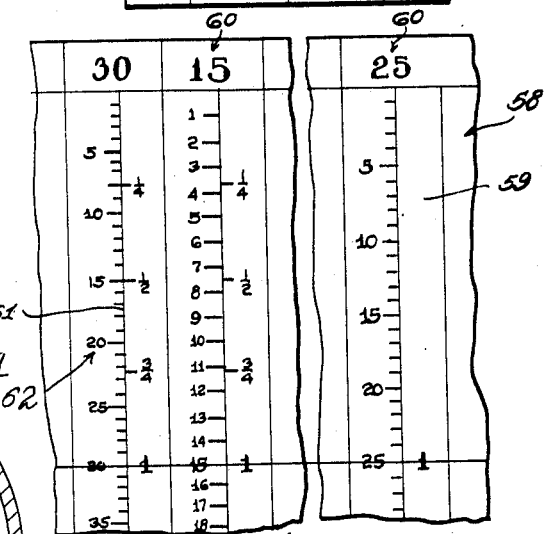

In the accompanying drawings, forming a part of this specification, and in which like numerals are employed to designate like parts throughout the same, Figure 1 is a side elevation of apparatus embodying my invention, Figure 2 is a central vertical sectional view through the housing of the dispenser, showing the interior elements in elevation, Figure 3 is a central vertical sectional view through the computing cylinder, associated elements being in section and in elevation, Figure 4 is a horizontal section taken on line 4—4 of Figure 2, Figure 5 is a fragmentary side elevation of the computing chart, Figure 6 is a similar view of a modified form of computing chart, Figure 7 is a side elevation of apparatus embodying a modified form of the invention, Figure 8 is a horizontal section taken on the line 8—8 of Figure 7, Figure 9 is a central vertical section through the upper end of the computing cylinder, and, Figure 10 is a fragmentary side elevation of a portion of the computing chart.

In the drawings, wherein for the purpose of illustration, are shown preferred embodiments of my invention, the numeral 15 designates a housing or body portion of a gasoline dispensing apparatus. Mounted upon the top of this housing or body portion is a visible or transparent tank 16, to receive the gasoline. The usual pumping means are employed to force the gasoline from the tank, usually in the ground, to the visible dispensing tank 16. As this means may be of any well known or preferred type, it is thought to be unnecessary to show the same, since it is well known in the art. The visible dispensing tank may be equipped with a scale 17, graduated in numbers, which increase in value upwardly and indicate the amount of gasoline contained within the tank 16. The character of the scale 17, will, of course, vary depending upon the capacity and shape of the tank 16, and for the purpose of illustration, the scale 17 is graduated from one to ten, inclusive, as the tank 16 is designed to contain ten gallons of gasoline.

A vertically adjustable overflow pipe is adapted for co-action with the visible dispensing tank 16 and embodies an upper pipe 18, the upper end of which is preferably provided with a flange 19, serving as a pointer for operation in connection with the scale 17. The pipe 18 is slidable within a bushing or gland (not shown), formed in the bottom of the tank 16, and the pipe 18 is preferably concentric within the tank 16. At its lower end, the pipe 18 is preferably internally screw-threaded, for receiving a reduced screw-threaded extension 20, formed upon the upper end of a pipe 21, having a larger diameter. The pipe 21 has its lower end externally screw-threaded, and engages within the internally screw-threaded end of a pipe 22, of greater diameter, and is preferably provided with a lock nut 23, as shown. The pipe 22 is provided upon one side with rack teeth 24, and this pipe has a smooth lower end 25, slidable within a gland 26, formed upon a stationary return pipe 27, which leads to the storage tank, usually in the ground. The various pipes, constitute in effect, a continuous overflow pipe, which is vertically adjustable.

The overflow pipe is vertically adjustable within the limits of its travel, but can not turn upon its longitudinal axis, and for this purpose a radial arm 28 is rigidly secured to the upper end of the pipe 22, and has its outer end slidable within a vertical slotted guide 29, carried by the housing 15.

Means are employed to raise and lower the overflow pipe, comprising a gear 30, rigidly mounted upon a transverse horizontal shaft 31, journaled in bearings 32, arranged within the housing 15. A bevel gear 33 is rigidly mounted upon the shaft 31 and is driven by a bevel gear 34. This bevel gear 34 is rigidly attached to the lower end of a vertical shaft 35, carried by a bracket 36, mounted within the housing 15. At its upper end, the shaft 35 carries a bevel gear 37, to turn it, and this bevel gear is engaged by a bevel gear 38, driven by a horizontal shaft 39, which may be turned by a handle or crank 40. While the means to raise and lower the overflow pipe is regarded as the preferred construction, yet the invention is not restricted to this shifting means, as other means may be employed.

The numeral 41 designates a rotatable computing cylinder, having hubs 42, rotatable upon the pipe 21. The lower hub 42 has rigid connection with a horizontal bevel gear 43, which rests upon a sleeve 44, which is clamped to the pipe 21 through the medium of a bolt 45 or by any suitable means. The computing cylinder is, therefore, supported against downward movement by the gear 43 resting upon the sleeve 44. The top of the pipe 21 extends a slight distance beyond the upper hub 42, so that a nut 46, screw-threaded upon the extension 20, below the pipe 18 may not have clamping engagement with the hub 42 and hold the cylinder against turning movement. The cylinder 41 preferably has a snug fit upon the pipe 21, so that it may be readily turned upon the pipe, but will not partake of accidental returning movement after adjustment. The cylinder also can not move perceptibly longitudinally with relation to the pipe 21 and the nut 46, after being screwed to the set position may be sealed in this position, whereby it could be determined if this element had been tampered with.

Means are provided to rotate the computing cylinder gear 43, comprising a horizontal radial shaft 47, the inner end of which is rotatably supported within a radial extension 48 formed upon the sleeve 44. The shaft 47 has a bevel gear 49 rigidly mounted thereon, in permanent mesh with the gear 43. The outer end of the shaft 47 is formed square in cross section, as indicated at 50, for the reception of a crank or handle 51′, when the shaft 47 moves into alinement with an opening 51, in the housing 15, which occurs when the overflow pipe is at the lowermost or zero position, and the tank 16 is empty. The crank 51′ is passed through the opening 51 to turn the shaft 47, and after the overflow pipe has been shifted from the lowermost or zero position, the crank 51′ can not be employed to turn the shaft 47. This prevents the adjustment of the computing cylinder, while the tank contains gasoline.

The computing cylinder carries upon its periphery a chart 52, secured thereto by any suitable means. In Figure 5, this chart is shown as provided with vertical lines 53, dividing the same into vertical columns 54, which are headed by price designations 55, at the tops thereof. The price designations are preferably arranged consecutively and may be varied as desired. Arranged adjacent to each vertical line 53 is a graduated scale embodying numerals 56, indicating the number of gallons of gasoline, these numerals being arranged consecutively and increasing in value downwardly. Arranged within the corresponding column 54 are vertical scales 57 of computations, giving the values of the number of gallons of gasoline in accordance with the price indications 55. This scale is computed to calculate the value of whole gallons of gasoline at varying prices.

In Figure 6, I have illustrated a fragmentary portion of the chart 58, wherein the vertical columns 59 are provided, having price designations 60 at their tops. Scales 61 are arranged within the columns 59, and are graduated to indicate gallons and fractions thereof, the graduations increasing in value downwardly. Scales 62 are arranged in the corresponding columns, to indicate the value of the gallons or fractions thereof, at the given price, as is obvious. The invention is not restricted to any price graduation of the scales as the scales may be varied as is obvious.

The housing 15 is provided with an elongated vertical slot 63, which may be covered by a section of glass, if desired, and this slot is of sufficient width to permit of the inspection of the graduated column of the scale, which has been turned to the visible position. The stationary pointer 64, is carried by the housing 15, and is co-related with the scales indicating the number of gallons and fractions thereof and the scales indicating the values in money of the selected amount of gasoline. If desired, the pointer or arrow 64 may be sealed, whereby it may be ascertained if the same has been tampered with.

The operation of this form of apparatus is as follows:

When the tank 16 is emptied and the overflow pipe 18 is in the zero or lowermost position, the crank 51 is turned to bring the selected price designation 55 to the center of the opening or slot 63. This crank 51 is now removed from the shaft 47. The crank 40 is now turned to elevate the overflow pipe 18, so that its upper end or flange 19 will register with the scale 17, indicating the gallons or fractions thereof of gasoline to be vended. The usual pumping means may now be employed to force the gasoline into the tank 16, and after a selected amount of the gasoline has thus passed into the tank 16, which would be determined by the elevation of the overflow pipe 18, this gasoline is withdrawn through the usual outlet hose, and conducted to the tank of an automobile or the like. If the overflow pipe 18 is adjusted to the "5" gallon elevation, the pointer 64 will be in alinement with "$1.25", appearing on the chart 52, and this will indicate the value of five gallons of gasoline at twenty-five cents a gallon. It is obvious that the value in money of other amounts of gasoline, at different prices, may be readily computed.

In the second form of my invention, as shown in Figures 7 to 10, inclusive, the numeral 65 designates the body portion of a dispensing apparatus, carrying upon its top a visible tank 66, equipped with a vertical scale 67, including numerals arranged consecutively from one to ten, inclusive, the numerals increasing in value upwardly. The numeral 68 designates a vertically movable overflow pipe, operating through the central portion of the bottom of the tank 66, and having a flange 69, at its top, serving as a pointer for the scale 67. The overflow pipe 68 extends downwardly through the body portion or housing 65 and is adapted to return gasoline to the storage tank in the ground. The overflow pipe 68 may be raised and lowered by a handle 70, adapted to be shifted into notches 71, formed in a rack 72, whereby the pipe 68 may be supported in any selected elevation.

The numeral 72' designates a computing cylinder which is vertically arranged upon one side of and adjacent to the pipe 68 and is confined within a housing 73. This cylinder is rotatably mounted upon a shaft 74, and may be held against accidental turning movement by a spring 75 or the like. The pipe 68 is provided with a pointer 76, rigidly secured thereto and located beneath and adjacent to the handle 70. This pointer is adapted for co-action with a chart 77 carried by the cylinder 72'. This chart has vertical lines 78, providing vertical columns 79, headed by price designations 80, preferably arranged consecutively. Arranged adjacent to the right hand lines 78 are scales embodying computations 81, indicating the value in money of the gasoline, in gallons and fractions thereof. The scale 81 is divided into points, each of which indicate the value of a penny. Arranged adjacent to the left hand lines 78, of each column 79 are scales 82, graduated to indicate the gallons of gasoline, and fractions thereof. The scale 82 is graduated to gallons and one-fourth gallons. The graduations of the scales 82 increase in value upwardly. The invention is in no sense restricted to the use of a scale embodying these precise designations.

In the use of this form of apparatus, the computing cylinder 72' is turned to bring a selected price, such as "30¢" to the front position. The overflow pipe 68 is now raised to the desired elevation, such as, to the "5" gallon elevation. The gasoline is now pumped into the cylinder 66 by the usual means (not shown), and the excess gasoline will return through the overflow pipe 68. The pointer 76 will now be in alinement with "$1.50", which is the correct value in money of five gallons of gasoline for the price indicated. The gasoline is now withdrawn from the tank 66 and fed to the tank in the automobile in the usual manner.

It is to be understood that the forms of my invention, herewith shown and described, are to be taken as preferred examples of the same, and that various changes in the shape size and arrangement of parts may be resorted to without departing from the spirit of my invention, or the scope of the subjoined claims.

Having thus described my invention, I claim:

1. In a gasoline dispensing apparatus, a casing having an opening formed therein, a tank mounted upon the casing, a longitudinally movable overflow pipe operating within the casing and extending into the tank, a cylinder rotatably mounted upon the overflow pipe and movable longitudinally therewith, said cylinder carrying a chart provided with a transverse scale including price designations and longitudinal scales including values in money for different volumes of gasoline at different prices, a gear connected with the cylinder to turn it, a support mounted upon the overflow pipe, a second gear rotatable upon the support and engaging the first named gear, a shaft connected with the second gear, said opening in the casing being at such an elevation that said shaft will register with it only when the overflow pipe is in the lowermost position, and means to raise and lower the overflow pipe.

2. In a gasoline dispensing apparatus, a casing having a window formed therein, a tank mounted upon the top of the casing, a longitudinally movable overflow pipe arranged within the casing and projecting into the tank, a price computing cylinder arranged within the casing and visible through the window and disposed beneath the tank and directly rotatably mounted upon the overflow pipe so that its axis of rotation coincides with the longitudinal axis of the overflow pipe, said cylinder being longitudinally movable with the overflow pipe, and a pointer for co-action with the rotatable cylinder.

3. In a gasoline dispensing apparatus, a casing having a window formed therein, a tank mounted upon the top of the casing, a longitudinally movable overflow pipe arranged within the casing and projecting into the tank, a price computing cylinder arranged within the casing and visible through the window and disposed beneath the tank and directly rotatably mounted upon the overflow pipe so that its axis of rotation coincides with the longitudinal axis of the overflow pipe, said cylinder being longitudinally movable with the overflow pipe, a pointer for co-action with the rotatable cylinder, and means to rotate the cylinder from the exterior of the casing only when the overflow pipe is in the lowermost position.

In testimony whereof I affix my signature.

THOMAS B. SMITH.